Sept. 16, 1952 E. A. SPRIGG 2,610,525
MOTION TRANSMITTING DEVICE
Filed May 19, 1945 3 Sheets-Sheet 1
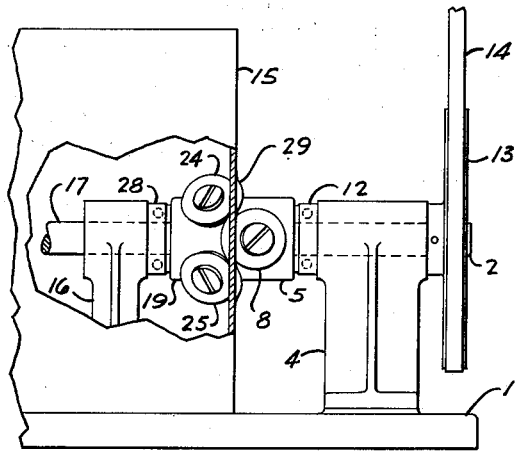
Fig. I
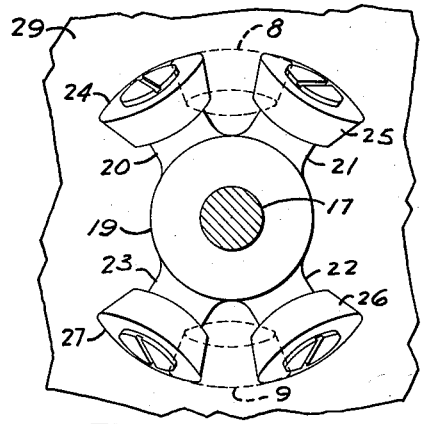
Fig. III
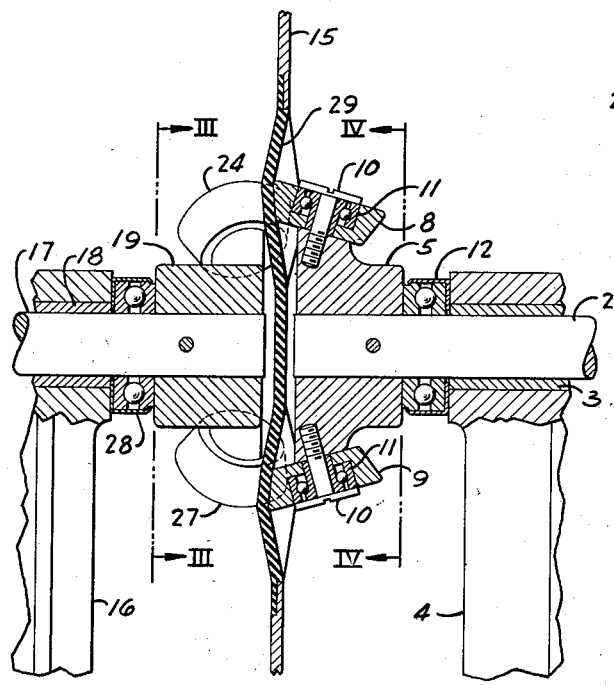
Fig. II
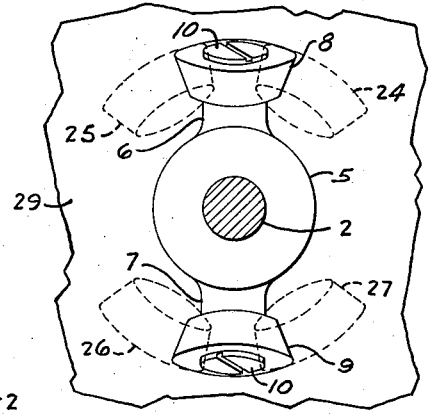
Fig. IV
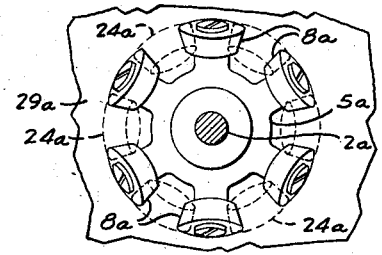
Fig. V
INVENTOR.
Edward A. Sprigg
BY
Marshall & Marshall
ATTORNEYS

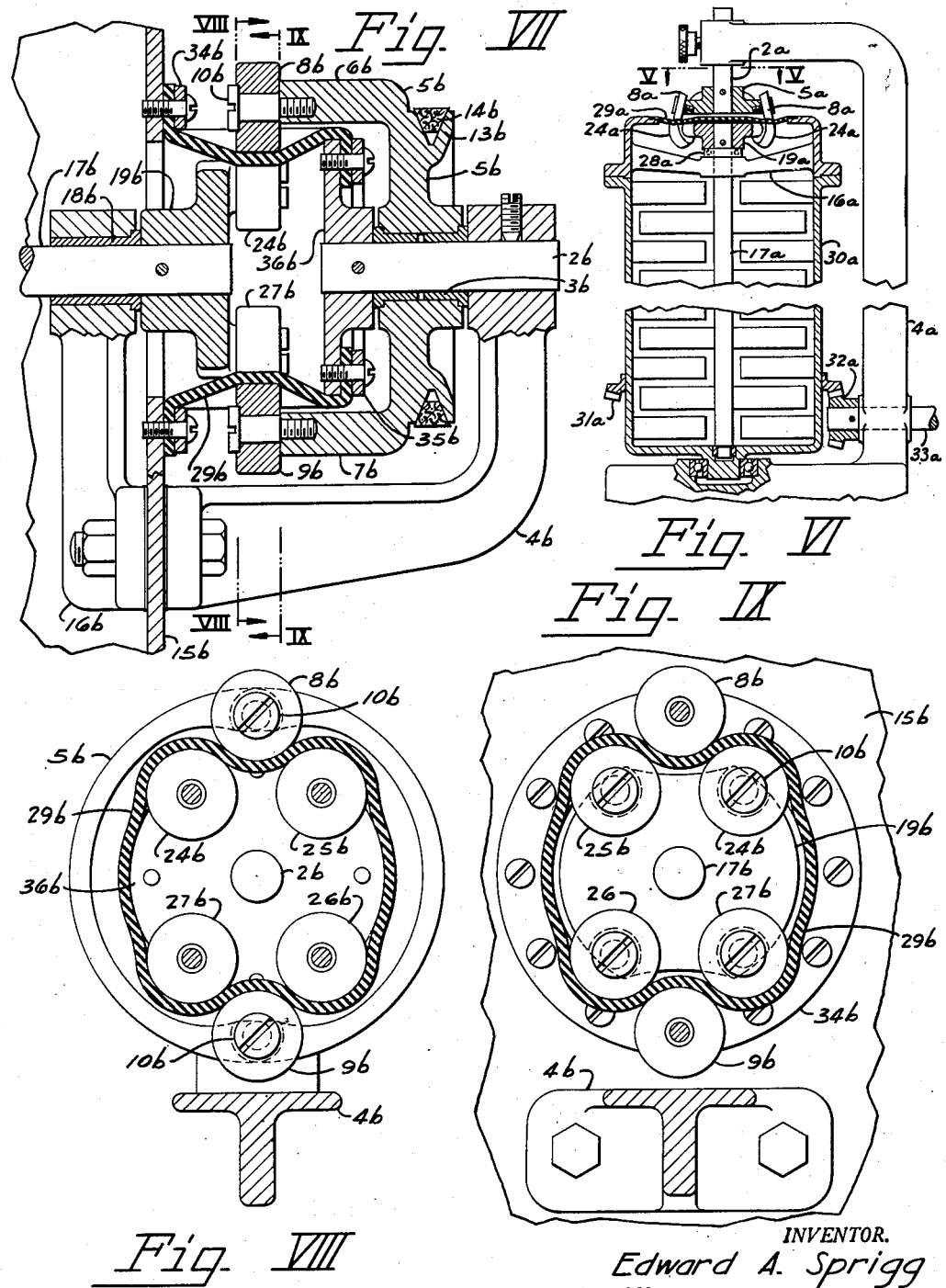

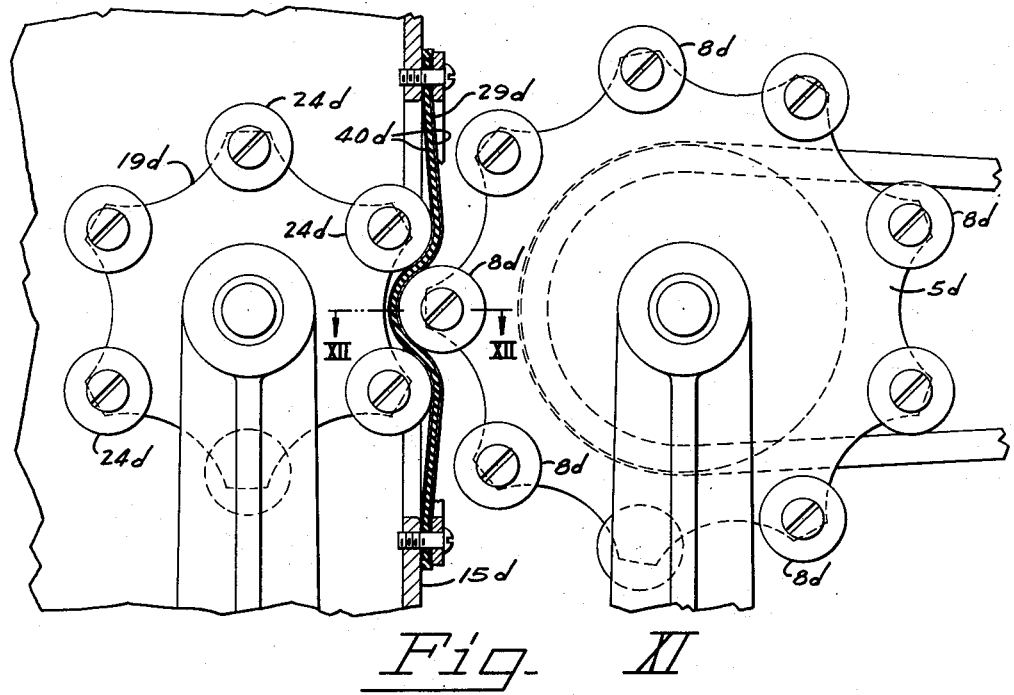
Fig. XI
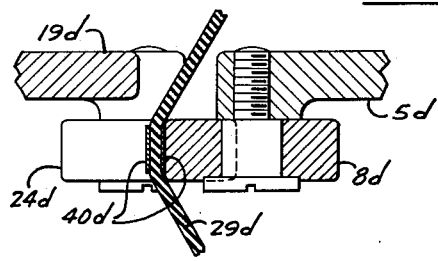
Fig. XII
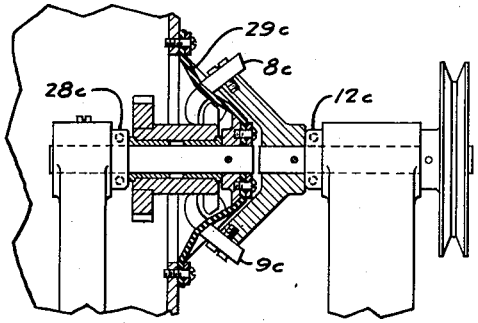
Fig. X
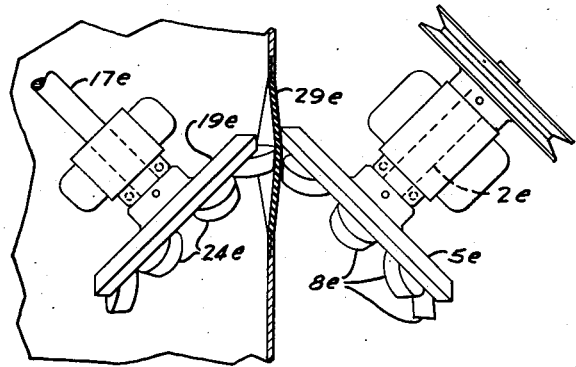
Fig. XIII
INVENTOR.
Edward A. Sprigg
BY Marshall & Marshall
ATTORNEYS Patented Sept. 16, 1952

2,610,525

UNITED STATES PATENT OFFICE 2,610,525

MOTION TRANSMITTING DEVICE

Edward A. Sprigg, Toledo, Ohio, assignor to H. H. Buggie & Company, Toledo, Ohio, a corporation of Ohio Application May 19, 1945, Serial No. 594,754

19 Claims. (Cl. 74—640)

This invention provides means for transmitting motion to mechanism inside a closed housing.

It is often desirable that mechanism be operated in an atmosphere or under pressure conditions that can be maintained only if the mechanism is housed in a fluid-tight casing. Certain electrical apparatus for example must, in order to function properly, be operated within a partial vacuum. Some refrigerating apparatus must be located within a chamber containing volatile liquid. Other devices are required to function within inert gases, and still others in atmospheres which must be closely confined. Such conditions require that the mechanism be enclosed in a fluid-tight housing, and where the mechanism is operated from an outside source of power it is often difficult to transmit the power from the outside to the inside of the housing without risk of leakage, which would destroy the vacuum or permit the escape or contamination of the confined fluid.

In some appliances, such for example as washing machines, it is important that power be transmitted through a leakproof bottom of a tub or other container.

It is a general object of this invention to provide means mechanically to transmit movement through an imperforate membrane.

A more specific object is to provide simple mechanical means for transmitting movement or power from the exterior to the interior, or vice versa, of a completely closed housing. This object is accomplished by causing movement of a driving member to be transmitted to a driven member through a fluid-tight flexible membrane.

It is a further object of the invention to provide driving and driven elements having rolling engagement, respectively, with opposite sides of a flexible membrane, the elements being so coordinated that as the driving elements roll over one side of the membrane the driven elements are caused to roll over the membrane's opposite side.

Other objects and advantages will be apparent from the following description, reference being had to the accompanying drawings in which several embodiments of the invention are illustrated so that the principle involved may be clearly understood, similar reference numerals being used to designate similar parts throughout the several views.

In the drawings:

Fig. I is a fragmentary front elevational view, with a part broken away and a part shown in section, illustrating a device incorporating one form of the invention;

Fig. II is an enlarged fragmentary vertical sectional view showing some of the mechanism illustrated in Fig. I;

Fig. III is a fragmentary view with a shaft in section, taken from the position indicated by the broken line III—III of Fig. II;

Fig. IV is a similar fragmentary elevational view with a shaft in section, taken from the position indicated by the broken line IV—IV of Fig. II;

Fig. V is a fragmentary sectional plan view taken from the position indicated by the broken line V—V of Fig. VI;

Fig. VI is a view, partly in elevation and partly in vertical section, showing a modified arrangement of the mechanism of the invention, parts being broken out to shorten the figure;

Fig. VII is a fragmentary vertical sectional view illustrating another form of the invention;

Fig. VIII is a fragmentary sectional view taken on the line VIII—VIII of Fig. VII;

Fig. IX is a fragmentary sectional view taken on the line IX—IX of Fig. VII;

Fig. X is a fragmentary front elevational view, with parts in section, showing a modification of the form of the invention illustrated in Fig. I;

Fig. XI is a fragmentary front elevational view, with parts in section, showing still another form of the invention;

Fig. XII is a fragmentary sectional plan view taken on the line XII—XII of Fig. XI; and Fig. XIII is a fragmentary front elevational view, with a membrane in section, showing a modification of a form of the invention illustrated in Fig. XI.

Refer now to the drawings in detail and particularly to Figs. I, II, III and IV thereof.

The mechanism is mounted upon a base 1, a horizontal driving shaft 2 being journaled in a bushing 3 which is inserted in the upper end of a standard 4. Fixed upon the shaft 2 is a spider 5 having oppositely extending arms 6 and 7 upon which freely rotatable frusto-conical rollers 8 and 9 are mounted by means of screws 10 and ball bearings 11. A ball thrust bearing 12 is interposed between the hub of the spider 5 and the standard 4, and a pulley 13 is fixed upon the end of the shaft 2 which extends beyond the standard 4, the pulley being adapted to be driven by a belt 14.

The mechanism so far described is located exteriorly of a housing 15 which is supported upon the base 1. Within the housing 15 is located a standard 16, and a shaft 17 is journaled in a bushing 18 which is mounted in the upper end of the standard 16, the shaft 17 being axially aligned with the shaft 2. Fixed upon the shaft 17 is a spider 19 having four arms 20, 21, 22 and 23 upon which freely rotatable frusto-conical rollers 24, 25, 26 and 27 are mounted by means of screws and ball bearings like those by means of which the rollers 8 and 9 are mounted. A ball thrust bearing 28 is interposed between the hub of the spider 19 and the standard 16, and the shaft 17 extends to and drives mechanism (not shown) located within the housing 15.

An imperforate flexible membrane 29, having a fluid-tight juncture with the housing 15, lies between the exterior spider 5 and the interior spider 19 with the rollers 8 and 9 pressing against the membrane 29 from the outside and the rollers 24, 25, 26 and 27 pressing against the membrane from the inside, the exterior and interior rollers being intermeshed so that when the exterior shaft 2 is turned in a clockwise direction (as seen in Fig. IV) the depressions in the membrane 29 caused by the pressure of the rollers 8 and 9 move with a wave-like motion, pushing against the interior rollers 24 and 26 and causing these interior rollers to roll ahead of the rollers 8 and 9 in a circular path over the inside surface of the membrane. As the interior rollers 24 and 26 move around this circular path they act through the spider 19 and shaft 17 to turn the mechanism (not shown) within the housing 15. Thus, while no mechanism extends through the membrane, motion nevertheless is transmitted from mechanism on one side of the membrane to mechanism on the other side.

If the exterior shaft 2 were to turn counterclockwise, the exterior rollers 8 and 9 would act through the membrane 29 upon the interior rollers 25 and 27, causing them to roll around a circular path on the inner surface of the membrane 29 to turn the inner shaft 17 counterclockwise.

Instead of constructing the device with the two-roller spider 5 outside and the four-roller spider 19 inside, this arrangement could be reversed; that is to say, the four-roller spider could be used as the driving spider and the two-roller spider could be used as the driven spider.

The device would be operative if one of the arms 7 of the exterior spider with its roller 9 and one corresponding pair of arms 22 and 23 of the interior spider with the co-acting rollers 26 and 27 were omitted, but the two-arm exterior spider and the four-arm interior spider are more efficient because, since they are symmetrical, bending forces and side thrusts which otherwise would be transmitted to the shafts 2 and 17 are counteracted.

Each of the spiders may, if desired, be equipped with more rollers properly spaced and proportioned to constitute a series of rollers on each spider, the two series intermeshing with each other through the membrane. This arrangement is illustrated in Fig. V and is used in the device illustrated in Fig. VI, which shows an upright rotary cylinder 30a carrying a ring gear 31a which is driven by a pinion 32a fixed to a rotating horizontal shaft 33a journaled in a bracket 4a. A vertical shaft 2a is fixed in the upper arm of the bracket 4a and carries a spider 5a upon which are mounted a series of freely rotatable frusto-conical rollers 8a—8a. Located within the cylinder 30a and journaled in a bracket 16a is a shaft 17a which has a spider 19a fixed upon its upper end, a series of frusto-conical rollers 24a—24a being mounted upon the spider 19a. A ball thrust bearing 28a is interposed between the hub of the spider 19a and the bracket 16a, and the lower end of the shaft is journaled in a socket in the bottom of the cylinder 30a.

A flexible membrane 29a, having a fluid-tight juncture with the top of the cylinder 30a, lies between the exterior spider 5a and the interior spider 19a with the rollers 8a pressing against the upper side of the membrane and the rollers 24a pressing against the lower side of the membrane, the exterior and interior rollers being intermeshed so that when the cylinder 30a is turned and the membrane is revolved between the rollers the interior rollers are prevented from moving bodily around with the membrane and the shaft 17a is held stationary while the cylinder 30a revolves. Any desired mechanism within the cylinder may be operated by the relative motion of the cylinder and the interior spider 19a.

Figs. VII, VIII and IX illustrate a form of the invention in which the membrane, instead of being disk-like, is an annular band.

In the device illustrated in Figs. VII, VIII and IX, a non-rotatable shaft 2b is fixed in the upper end of an exterior bracket 4b. Rotatably mounted upon the shaft 2b is a bushing 3b that is fitted into a spider 5b having horizontally extending arms 6b and 7b upon which cylindrically-shaped rollers 8b and 9b are mounted by means of shouldered screws 10b. A pulley 13b is formed upon or attached to the spider 5b and adapted to be turned by a belt 14b. The bracket 4b is mounted upon the exterior of a housing 15b, and located interiorly of the housing is a bracket 16b which carries a shaft 17b that is journaled in a bushing 18b in the upper end of the bracket 16b.

Fixed upon the shaft 17b is a spider 19b having horizontally projecting arms upon which rollers 24b, 25b, 26b and 27b are mounted by means of shouldered screws 10b. Extending around the interior rollers 24b, 25b, 26b and 27b and lying within the compass of the exterior rollers 8b and 9b is a flexible membrane in the form of an annular band 29b, one edge of which is clamped by means of a clamping ring 34b to the housing 15b to form a fluid-tight juncture therewith, the other end being clamped by means of a clamping ring 35b to a disk 36b which is fixed upon the inner end of the stationary shaft 2b and which, since the membrane has a fluid-tight juncture therewith, constitutes a part of the housing 15b.

In the operation of the form of the device, if the spider 5b is turned clockwise (as seen in Fig. VIII), the cylindrical rollers 8b and 9b roll about the band 29b, and as the depressions caused by the pressure of the rollers 8b and 9b against the exterior of the band 29b move clockwise with wave-like motion, they push the interior rollers 25b and 27b clockwise. If the spider 5b is turned counterclockwise, the wave-like movement of the depressions in the membrane band 29b push the rollers 24b and 26b counterclockwise.

This form of the device will operate with a single exterior roller 8b and a single pair of interior rollers 24b and 25b, but oppositely located exterior rollers 8b and 9b and oppositely located pairs of interior rollers are preferable in order that radial thrust may be counteracted in the spiders and not transferred to the bushings. Each of the spiders 5b and 19b may, if desired, be equipped with more rollers properly proportioned to constitute a series of rollers on each spider, the two series intermeshing with each other through the membrane.

Fig. X illustrates a form of the device which may be regarded as intermediate between the form illustrated in Figs. I to IV and that illustrated in Figs. VII to IX, the membrane 29c in the form of device illustrated in Fig. X being conical rather than disk-like or cylinder-like. The rollers 8c and 9c are frustums of cones but are more nearly cylindrical than the rollers 8 and 9 of the mechanism illustrated in Figs. I to IV, and theoretically the main shaft bearings 12c and 28c, in the form illustrated in Fig. X, are subjected to less end thrust than is the case in the form illustrated in Figs. I to IV.

In each of the forms of device heretofore described the exterior spider and the interior spider turn about coincident axes. In the form of device illustrated in Figs. XI and XII the axes about which the exterior and interior spiders turn are not coincident but are parallel. The exterior spider 5d carries a series of rollers 8d, while the interior spider 19d carries a series of rollers 24d. The exterior rollers 8d successively engage the membrane 29d and cause depressions to push successively against interior rollers 24d, the action being somewhat like that of spur gearing. If desired, thin strips of metal 40d may be so attached to the housing 15d as to overlie the softer material of the membrane in the path of the gears, bending of the flat strips of metal offering little resistance to the movement of the mechanism.

In the form of device illustrated in Fig. XIII, the shafts 2e and 17e are neither parallel nor aligned. The exterior spider 5e carries a series of rollers 8e which are frustums of cones the apex angles of which are sharper than the apex angles of the projected cones of the rollers illustrated in Figs. I to IV which roll in circular paths against a membrane. The interior spider 19e carries a series of rollers 24e which may be similar to or identical with the exterior rollers 8e. The exterior rollers 8e successively engage the membrane 29e and cause depressions to push successively against the interior rollers 24e, the action being somewhat like that of bevel gearing.

This application is a continuation-in-part as to common subject matter of my application Serial No. 573,854, filed January 22, 1945, for Power Transmitting Means, now abandoned.

The embodiments of my invention herein shown and described are to be regarded as illustrative only, and it is to be understood that the invention is susceptible to variation, modification and change within the spirit and scope of the subjoined claims.

Having described my invention, I claim:

1. Sealed power transmitting mechanism comprising; a casing wall having an imperforate deformable portion, a driving member supported for rotation at one side of said wall, a driven member at the opposite side of said wall supported for rotation about an axis substantially in alignment with the axis of said driving member, a rolling element supported on one of said members for revolution about the axis thereof and for rotation about an axis extending generally parallel to the plane of said deformable wall portion and having rolling engagement with one side thereof, a rolling element supported on the other of said members for revolution about the axis thereof and for rotation about an axis extending generally parallel to the plane of said deformable wall portion and having rolling engagement with the other side of said deformable wall portion, the rolling elements on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

2. Sealed power transmitting mechanism comprising; a casing wall having an imperforate deformable portion, a driving member supported for rotation at one side of said wall, a driven member at the opposite side of said wall supported for rotation about an axis substantially in alignment with the axis of said driving member, a pair of angularly spaced rolling elements supported on one of said members for revolution about the axis thereof and for rotation about axes extending generally parallel to the plane of said deformable wall portion and having rolling engagement with one side thereof, a rolling element supported on the other of said members for revolution about the axis thereof and for rotation about an axis extending generally parallel to the plane of said deformable wall portion and having rolling engagement with the other side of said deformable wall portion between said pair of spaced rolling elements, the rolling elements on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

3. Sealed power transmitting mechanism comprising; a casing wall having an imperforate substantially flat deformable portion, a driving member at one side of said wall supported for rotation about an axis substantially normal to said flat deformable wall portion, a driven member at the opposite side of said wall supported for rotation about an axis substantially in alignment with the axis of said driving member, a rolling element supported on one of said members for revolution about the axis thereof and for rotation about an axis extending generally parallel to the plane of said deformable wall portion and having rolling engagement with one side thereof, a rolling element supported on the other of said members for revolution about the axis thereof and for rotation about an axis extending generally parallel to the plane of said deformable wall portion and having rolling engagement with the other side of said deformable wall portion, the rolling elements on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

4. Sealed power transmitting mechanism comprising; a casing wall having an imperforate substantially flat deformable portion, a driving member at one side of said wall supported for rotation about an axis substantially normal to said flat deformable wall portion, a driven member at the opposite side of said wall supported for rotation about an axis substantially in alignment with the axis of said driving member, a pair of angularly spaced rolling elements supported on one of said members for revolution about the axis thereof and for rotation about axes extending generally parallel to the plane of said deformable wall portion and having rolling engagement with one side thereof, a rolling element supported on the other of said members for revolution about the axis thereof and for rotation about an axis extending generally parallel to the plane of said deformable wall portion and having rolling engagement with the other side of said deformable wall portion between said pair of spaced rolling elements, the rolling elements on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

5. Sealed power transmitting mechanism comprising; a casing wall having an imperforate cup-shaped part provided with a tubular walled deformable portion, a driving member at one side of said wall supported for rotation about an axis substantially aligned with the axis of the tubular walled deformable portion, a driven member at the other side of said wall supported for rotation about an axis substantially in alignment with that of said driving member, a roller supported on one of said members for revolution about the axis thereof and for rotation about an axis extending generally parallel to the plane of said deformable portion and having rolling engagement with one side thereof, a roller supported on the other of said members for revolution about the axis thereof and for rotation about an axis extending generally parallel to the plane of said deformable portion and having rolling engagement with the other side thereof, the rollers on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

6. Sealed power transmitting mechanism comprising; a casing wall having an imperforate cup-shaped part provided with a tubular wall deformable portion, a driving member at one side of said wall supported for rotation about an axis substantially aligned with the axis of the tubular walled deformable portion, a driven member at the other side of said wall supported for rotation about an axis substantially in alignment with that of said driving member, a pair of angularly spaced rollers supported on one of said members for revolution about the axis thereof and for rotation about axes extending generally parallel to the plane of said deformable portion and having rolling engagement with one side thereof, a roller supported on the other of said members for revolution about the axis thereof and for rotation about an axis extending generally parallel to the plane of said deformable portion and having rolling engagement with the other side thereof between said pair of spaced rollers, the rollers on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

7. Mechanism for transmitting rotational movement through a wall having an imperforate deformable portion, comprising a driving member supported for rotation at one side of said wall, a driven member at the opposite side of said wall supported for rotation about an axis lying in the same plane as the axis of said driving member, a rolling element supported on one of said members for revolution about the axis thereof and for rotation in rolling engagement with one side of said deformable wall portion on an axis generally parallel to the line of contact of said rolling element with the surface of said deformable wall portion, a rolling element supported on the other of said members for revolution about the axis thereof and for rotation on an axis extending generally parallel to the axis of the first mentioned rolling element and having rolling engagement with the other side of said deformable wall portion, the rolling elements on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

8. Mechanism for transmitting rotational movement through a wall having an imperforate deformable portion, comprising a driving member supported for rotation at one side of said wall, a driven member at the opposite side of said wall supported for rotation about an axis lying in the same plane as the axis of said driving member, a pair of angularly spaced rolling elements supported on one of said members for revolution about the axis thereof and for rotation in rolling engagement with one side of said deformable wall portion on an axis generally parallel to the line of contact of said rolling element with the surface of said deformable wall portion, a rolling element supported on the other of said members for revolution about the axis thereof and for rotation on an axis extending generally parallel to the axis of the first mentioned rolling element and having rolling engagement with the other side of said deformable wall portion between said pair of spaced rolling elements, the rolling elements on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

9. Sealed power transmitting mechanism comprising; a casing wall having an imperforate deformable portion, a driving member supported for rotation at one side of said wall, a driven member at the opposite side of said wall supported for rotation about an axis lying in the same plane as the axis of said driving member, a rolling element supported on one of said members for revolution about the axis thereof and for rotation in rolling engagement with one side of said deformable wall portion on an axis generally parallel to the line of contact of said rolling element with the surface of said deformable wall portion, a rolling element supported on the other of said members for revolution about the axis thereof and for rotation on an axis extending generally parallel to the axis of the first mentioned rolling element and having rolling engagement with the other side of said deformable wall portion, the rolling elements on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

10. Sealed power transmitting mechanism comprising; a casing wall having an imperforate deformable portion, a driving member supported for rotation at one side of said wall, a driven member at the opposite side of said wall supported for rotation about an axis lying in the same plane as the axis of said driving member, a pair of angularly spaced rolling elements, supported on one of said members for revolution about the axis thereof and for rotation in rolling engagement with one side of said deformable wall portion on an axis generally parallel to the line of contact of said rolling element with the surface of said deformable wall portion, a rolling element supported on the other of said members for revolution about the axis thereof and for rotation on an axis extending generally parallel to the axis of the first mentioned rolling element and having rolling engagement with the other side of said deformable wall portion between said pair of spaced rolling elements, the rolling elements on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

11. Sealed power transmitting mechanism comprising; a casing wall having an imperforate deformable portion, a driving member supported for rotation at one side of said wall, a driven member at the opposite side of said wall supported for rotation about an axis substantially in alignment with the axis of said driving member, a rolling element supported on one of said members for revolution about the axis thereof and for rotation in rolling engagement with one side of said deformable wall portion on an axis generally parallel to the line of contact of said rolling element with the surface of said deformable wall portion, a rolling element supported on the other of said members for revolution about the axis thereof and for rotation on an axis extending generally parallel to the axis of the first mentioned rolling element and having rolling engagement with the other side of said deformable wall portion, the rolling elements on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

12. Sealed power transmitting mechanism comprising; a casing wall having an imperforate cup-shaped deformable portion, a driving member at one side of said wall supported for rotation about an axis substantially aligned with the axis of the deformable portion, a driven member at the other side of said wall supported for rotation about an axis substantially in alignment with that of said driving member, a roller supported on one of said members for revolution about the axis thereof and for rotation in rolling engagement with one side of said deformable portion on an axis generally parallel to the line of contact of said roller with the surface of said deformable portion, a roller supported on the other of said members for revolution about the axis thereof and for rotation on an axis extending generally parallel to the axis of the first mentioned roller and having rolling engagement with the other side of said deformable portion, the rollers on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

13. Sealed power transmitting mechanism comprising; a casing wall having an imperforate cup-shaped part provided with a tubular walled deformable portion, a driving member at one side of said wall supported for rotation about an axis substantially aligned with the axis of the tubular walled deformable portion, a driven member at the other side of said wall supported for rotation about an axis substantially in alignment with that of said driving member, a roller supported on one of said members for revolution about the axis thereof and for rotation in rolling engagement with one side of said deformable portion on an axis generally parallel to the axis of the deformable portion, a roller supported on the other of said members for revolution about the axis thereof and for rotation on an axis extending generally parallel to the axis of said deformable portion and having rolling engagement with the other side thereof, the rollers on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

14. Sealed power transmitting mechanism comprising; a casing wall having an imperforate cone-shaped deformable portion, a driving member at one side of said wall supported for rotation about an axis substantially aligned with the axis of the cone walled deformable portion, a driven member at the other side of said wall supported for rotation about an axis substantially in alignment with that of said driving member, a roller supported on one of said members for revolution about the axis thereof and for rotation in rolling engagement with one side of said deformable portion on an axis generally parallel to the line of contact of said roller with the surface of said deformable portion, a roller supported on the other of said members for revolution about the axis thereof and for rotation on an axis extending generally parallel to the axis of the first mentioned roller and having rolling engagement with the other side of said deformable portion, the rollers on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

15. Sealed power transmitting mechanism comprising; a casing wall having an imperforate deformable portion, a driving member supported for rotation at one side of said wall, a driven member at the opposite side of said wall supported for rotation about an axis substantially parallel to the axis of said driving member, a rolling element supported on one of said members for revolution about the axis thereof and for rotation in rolling engagement with one side of said deformable wall portion on an axis generally parallel to the line of contact of said rolling element with the surface of said deformable wall portion, a rolling element supported on the other of said members for revolution about the axis thereof and for rotation on an axis extending generally parallel to the axis of the first mentioned rolling element and having rolling engagement with the other side of said deformable wall portion, the rolling elements on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

16. Sealed power transmitting mechanism comprising; a casing wall having a substantially flat imperforate deformable portion, a driving member supported for rotation at one side of said wall, a driven member at the opposite side of said wall supported for rotation about an axis substantially parallel to the axis of said driving member, a rolling element supported on one of said members for revolution about the axis thereof and for rotation in rolling engagement with one side of said deformable wall portion on an axis generally parallel to the line of contact of said rolling element with the surface of said deformable wall portion, a rolling element supported on the other of said members for revolution about the axis thereof and for rotation on an axis extending generally parallel to the axis of the first mentioned rolling element and having rolling engagement with the other side of said deformable wall portion, the rolling elements on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

17. Sealed power transmitting mechanism comprising; a casing wall having a substantially flat imperforate deformable portion, a driving member supported for rotation at one side of said wall on an axis extending substantially parallel to the plane of said deformable portion, a driven member at the opposite side of said wall support for rotation about an axis substantially parallel to the axis of said driving member, a rolling element supported on one of said members for revolution about the axis thereof and for rotation about an axis extending generally parallel to the plane of said deformable wall portion and having rolling engagement with one side thereof, a rolling element supported on the other of said members for revolution about the axis thereof and for rotation about an axis extending generally parallel to the plane of said deformable wall portion and having rolling engagement with the other side of said deformable wall portion, the rolling elements on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

18. Sealed power transmitting mechanism comprising; a casing wall having an imperforate deformable portion, a driving member supported for rotation at one side of said wall, a driven member at the opposite side of said wall supported for rotation about an axis lying in the same plane as the axis of said driving member and extending angularly relative thereto, a rolling element supported on one of said members for revolution about the axis thereof and for rotation in rolling engagement with one side of said deformable wall portion on an axis generally parallel to the line of contact of said rolling element with the surface of said deformable wall portion, a rolling element supported on the other of said members for revolution about the axis thereof and for rotation on an axis extending generally parallel to the axis of the first mentioned rolling element and having rolling engagement with the other side of said deformable wall portion, the rolling elements on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

19. Sealed power transmitting mechanism comprising; a casing wall having a substantially flat imperforate deformable portion, a driving member supported for rotation at one side of said wall, a driven member at the opposite side of said wall supported for rotation about an axis lying in the same plane as the axis of said driving member and extending angularly relative thereto, a rolling element supported on one of said members for revolution about the axis thereof and for rotation in rolling engagement with one side of said deformable wall portion on an axis generally parallel to the line of contact of said rolling element with the surface of said deformable wall portion, a rolling element supported on the other of said members for revolution about the axis thereof and for rotation on an axis extending generally parallel to the axis of the first mentioned rolling element and having rolling engagement with the other side of said deformable wall portion, the rolling elements on opposite sides of the wall being offset from each other angularly of the axis of said members and having juxtaposed paths of travel the spacing between which is less than the thickness of said deformable wall portion, to deform the same and provide for the transmission of rotative movement from one member to the other through the medium of said deformable wall portion.

EDWARD A. SPRIGG.

REFERENCES CITED

The following references are of record in the file of this patent:

UNITED STATES PATENTS

| Number | Name | Date |
|---|---|---|
| 2,119,955 | Litton | June 7, 1938 |
| 2,137,303 | Nelson | Nov. 22, 1938 |